United States Patent
Cohen et al.

(10) Patent No.: US 8,095,830 B1
(45) Date of Patent: Jan. 10, 2012

(54) DIAGNOSIS OF SYSTEM HEALTH WITH EVENT LOGS

(75) Inventors: Ira Cohen, Sunnyvale, CA (US); Chengdu Huang, Champaign, IL (US); Magnus Karlsson, Sollentuna (SE)

(73) Assignee: Hewlett-Packard Development Company, L.P., Houston, TX (US)

( * ) Notice: Subject to any disclaimer, the term of this patent is extended or adjusted under 35 U.S.C. 154(b) by 748 days.

(21) Appl. No.: 11/732,454

(22) Filed: Apr. 3, 2007

(51) Int. Cl.
*G06F 11/00* (2006.01)

(52) U.S. Cl. .................. 714/45; 714/47.1; 714/47.2

(58) Field of Classification Search .............. 714/1–57, 714/723, 719, 724, 47.1, 47.2; 726/23; 715/513, 715/234; 717/153; 707/4; 709/224, 227
See application file for complete search history.

(56) References Cited

U.S. PATENT DOCUMENTS

| | | | | |
|---|---|---|---|---|
| 5,991,806 A * | 11/1999 | McHann, Jr. | ................. | 709/224 |
| 6,592,627 B1 * | 7/2003 | Agrawal et al. | ............... | 715/234 |
| 6,662,171 B1 * | 12/2003 | Goertz | ............................. | 706/45 |
| 7,171,590 B2 * | 1/2007 | Kadoi | ............................. | 714/48 |
| 7,302,618 B1 * | 11/2007 | Shafer et al. | .................... | 714/48 |
| 7,668,953 B1 * | 2/2010 | Sinclair et al. | ................ | 709/224 |
| 7,747,083 B2 * | 6/2010 | Tawde | ........................... | 382/225 |
| 2003/0101385 A1 * | 5/2003 | Lee | .................................... | 714/48 |
| 2005/0010323 A1 * | 1/2005 | Cocciadiferro et al. | ...... | 700/174 |
| 2006/0074597 A1 * | 4/2006 | Raphael et al. | ............... | 702/183 |
| 2006/0143291 A1 * | 6/2006 | Hayamatsu | ................... | 709/224 |
| 2006/0173863 A1 * | 8/2006 | Paulus et al. | .................. | 707/100 |
| 2006/0188011 A1 | 8/2006 | Goldszmidt et al. | | |
| 2006/0195356 A1 * | 8/2006 | Nerenhausen et al. | ......... | 705/14 |
| 2007/0234426 A1 * | 10/2007 | Khanolkar et al. | ............. | 726/23 |
| 2007/0255979 A1 * | 11/2007 | Deily et al. | ..................... | 714/45 |
| 2008/0010680 A1 * | 1/2008 | Cao et al. | ........................ | 726/23 |
| 2008/0103736 A1 * | 5/2008 | Chin et al. | ........................ | 703/2 |
| 2008/0162982 A1 * | 7/2008 | Li et al. | .............................. | 714/3 |

OTHER PUBLICATIONS

Cohen, I. et al., "Correlating Instrumentation Data to System States: A Building Block for Automated Diagnosis and Control", Dec. 2004.

* cited by examiner

*Primary Examiner* — Scott Baderman
*Assistant Examiner* — Sarai Butler

(57) ABSTRACT

A method for diagnosing system health with system event logs is provided. The method includes receiving a plurality of event logs and health indicator states from a system; transducing the plurality of event logs into numeric-based metrics of the system; and deriving, based on the transduced numeric-based metrics, at least one model of the system that correlates the plurality of event logs to the corresponding health indicator states.

20 Claims, 5 Drawing Sheets

DIAGNOSIS OF SYSTEM HEALTH WITH EVENT LOGS

BACKGROUND

The complexity of current computing systems and applications provided therein is quickly outgrowing the human ability to manage at an economic cost. For example, it is common to find data centers with thousands of host computing systems servicing hundreds to thousands of applications and components that provide web, computations and other services. In such distributed environments, diagnosis of failures and performance problems is an extremely difficult task for human operators. To facilitate diagnosis, commercial and open source management tools have been developed to measure and collect data from systems, networks and applications in the form of system metrics (i.e., data measurements), application metrics, and system and application event logs. However, with the large amounts of data collected, the operator is faced with the daunting task of manually going through the data, which is becoming unmanageable. These challenges have led researchers to propose the use of automated machine learning and statistical learning theory methods to aid with the detection, diagnosis and repair efforts of distributed systems and applications.

As referred herein, system and application event logs (hereinafter, "event logs" or "logs") are records of system (both hardware and software) and application (software) events that have taken place in a system. Examples of event logs include but are not limited to failures to start a component or complete an action, system or application performance reaching predetermined thresholds, system or application errors, security events, network connection events. Each event entry typically includes a date stamp, a time stamp, and a message detailing the event. Unlike system metrics and application metrics, which contain structured numeric data, event logs are semi-structured and typically contain free text information. Event logs are essentially text messages written by the developers of the system and application. There are potentially many different messages. For example, it was found that there were more than 280,000 distinct event messages (after removing timestamps and fields containing numerical symbols only) in the event logs collected on one instance of an Information Technology (IT) system in a 9-month period.

Some prior solutions for diagnosing and repairing distributed systems and applications involve the use of search engines (e.g., as available from the Splunk Company of San Francisco, Splunk.com) or analysis modules (e.g., as available from LogLogic, Inc. of San Jose, Calif., loglogic.com) to perform indexing and parsing of the logs, whereby users have to provide adequate search queries to find desired information about the system or application health in the logs. Other prior solutions simply provide analyses of logs without correlating them with defined application or system health and typically require knowledge of the log structures and types of log messages a-priori. This leads to a finding of many types of data patterns in the logs that may not be important for diagnosing or forecasting a system or application behavior.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
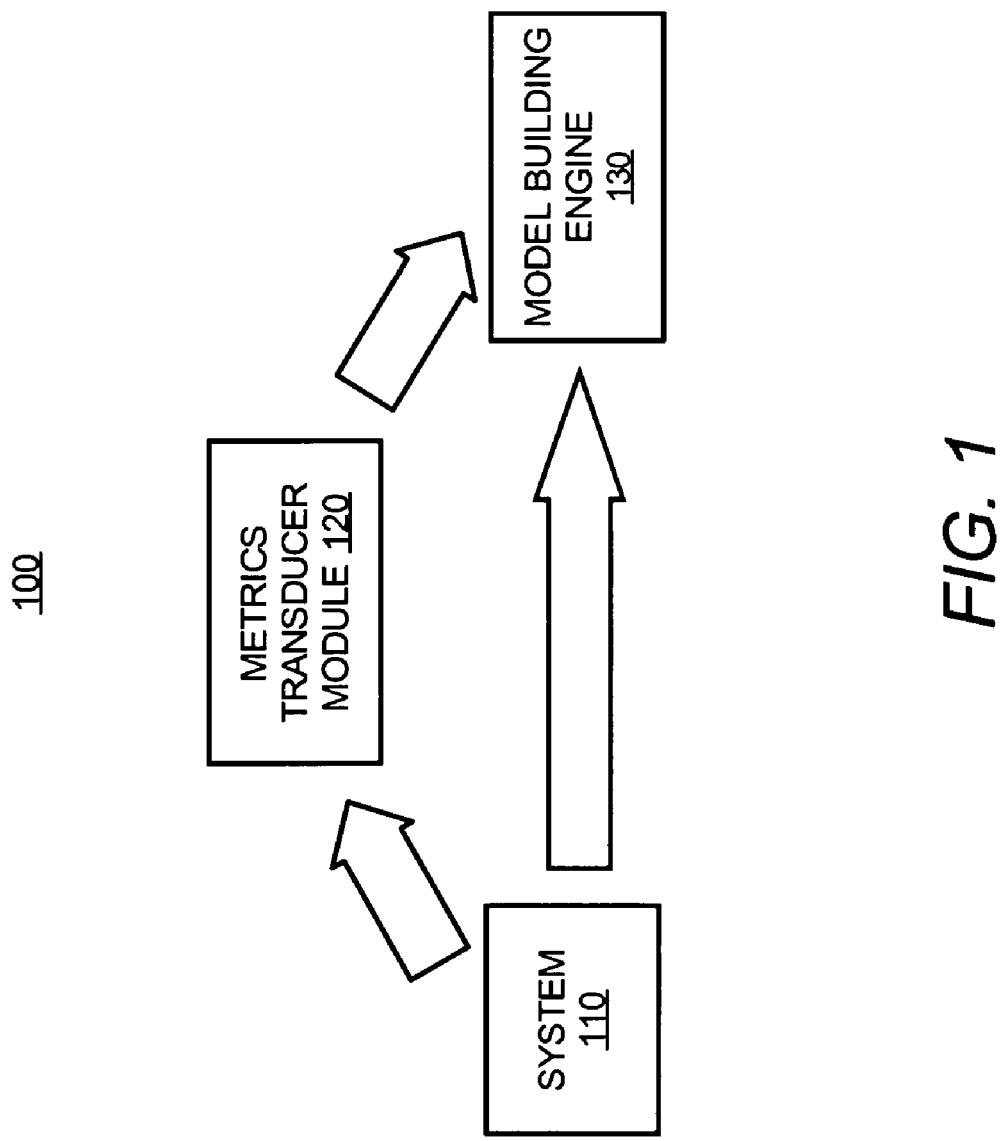
FIG. 1 illustrates a system wherein one or more embodiments may be practiced.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Because of the sheer size and number of types of event logs that may be generated in an IT system, there is a need for a systematic approach to distill a smaller set of "prototypical" or exemplary feature messages or clusters (hereinafter, "PM set") from the event logs to simplify the monitoring of such logs. Once the PM set is defined, it is used to transduce the text event logs into numeric-based metrics for input into learning probabilistic classifier models (hereinafter, "classifier models" or "models") that capture the correlation between the numeric-based metrics and predefined system health indicators. One type of such classifier models is described in U.S. Patent Application Publication No. 2006/0188011(hereinafter, "Publication PAP-011"), with publication date of Aug. 24, 2006 of U.S. patent application Ser. No. 10/987,611, filed Nov. 12, 2004, which is herein incorporated by reference in its entirety. Alternative embodiments are contemplated wherein other models for correlating the numeric-based metrics and the system health states are applicable as well. As referred herein, numeric-based metrics of a system are numeric (as opposed to textual messages in event logs) data measurements indicating conditions of the system and applications operating therein. As also referred herein, a system health indicator provides a status or state of the system in accordance with predefined acceptable thresholds. A system health indicator may have one or more states to indicate different levels of system health. An example of a system health indicator is a service level objective (SLO) typically found in a service level agreement (SLA). A system SLO may have two states, compliance or violation to indicate whether such a SLO has been complied or violated in the system. It also may have more than two states to indicate different levels of system health, such violation, 50% compliance, full compliance, etc.

Described herein are methods and systems that provide an efficient representation of event logs of an IT system and applications therein that is amenable to modeling techniques that produce diagnosis or forecasting of the system health. As referred herein, and as understood in the art, information technology, or IT, encompasses all forms of technology, including but not limited to the design, development, installation, and implementation of hardware and software information or computing systems and software applications, used to create, store, exchange and utilize information in its various forms including but not limited to business data, conversations, still images, motion pictures and multimedia presentations technology and with the design, development, installation, and implementation of information systems and applications. IT distributed environments may be employed, for example, by Internet Service Providers (ISP), web merchants, and web search engines to provide IT applications and services to users.

System

FIG. 1 illustrates a block diagram of an environment 100 wherein an embodiment may be practiced. The environment 100 includes an IT system 110, a metrics transducer module 120, and a model building engine or module 130. The IT system 110 includes one or more computing machines, each computing machine hosting one or more software applications or components. Examples of computing systems include but are not limited to personal computers, workstations, mainframe computers, web servers, application servers, database servers.

The IT system 110 is instrumented to generate system event logs, which includes event logs of both the system hardware and software applications therein, and monitored values for the predefined system health indicators in any manner known in the art. For example, commercially available data collection tools such as OpenView application by Hewlett Packard® Company and Microsoft NT 4.0 Performance Counters by Microsoft may be used to monitor the IT system 110.

The metrics transducer module 120 is operable to receive the event logs generated by the system 110 and transduce the event logs into metrics. In one embodiment, the metrics transducer module 120 distills a PM set from the received event logs by performing text clustering. The metrics transducer module 120 performs text clustering by combining similar event messages in the event logs to form a cluster. For example, messages generated by the same fprintf statements with slightly different parameters may be organized or classified into a single cluster. In effect, message clustering reverse engineers the "templates" that were used to generate the event messages and ignore the minor differences. In one embodiment, the message clustering is sequentially performed in an incremental fashion because over the lifetime of the system 110, code changes may be pushed into production that result in new messages appearing. Alternatively, it is possible to wait until all possible event messages are found in the collected events logs before they are batch clustered. The sequential clustering methodology is now described. However, it should be understood by one skilled in the art, based on the present disclosure herein, that minor modification may be done in order to apply such a methodology to batch clustering.

According to one embodiment, the similarity between two text messages found in the event logs is measured with a cosine distance function:

$$D_{cos}(A, B) = \frac{\sum_i match(a_i, b_i)}{\sqrt{|A| \cdot |B|}}, \quad \text{Equation 1}$$

$$match(a_i, b_i) = \begin{cases} 1 & \text{if } a_i = b_i \\ 0 & \text{otherwise} \end{cases}$$

where A and B are the messages, |•| represents the number of words in a message, and $a_i$ is the i'th word in message A. The cosine distance is a number between 0 and 1. When $D_{cos}=1$, the two messages A and B are identical, and when $D_{cos}=0$, the two messages are completely different. Upon seeing a new message, the clustering method compares the new message with the existing clusters (each cluster representing a prototypical feature message). If there exists a cluster to which the cosine distance is larger than a predefined threshold (e.g., 0.85), then the message is added to the existing cluster count. Otherwise, a new cluster is created with the new message. For example, the following event messages:

java.net.connectexception: db server connection refused; error host001; and java.net.connectexception: db server connection refused; error code are clustered together because their cosine distance is 0.857 (>0.85).

The metrics transducer module 120 then counts a number of times each prototypical feature message appears in a given time interval (set to match the interval of the predefined system health indicators) and use these counts as the input metrics for classifier models. It should be noted that the statistical properties of these feature-message-based metrics is different compared to system metrics or application metrics. In one embodiment, a different distribution for these input metrics is used in the classifier models. For system metrics, the normal distribution is used; whereas, for feature-message-based metrics, a modified Gamma distribution is used, which the inventors have observed to fit better than the normal and other distributions. Formally, the modified Gamma distribution follows:

$$P(x = X) = \begin{cases} p_z & \text{if } X = 0 \\ (1-p_z)X^{k-1}\frac{e^{-X/\theta}}{\Gamma(k)\theta^k} & \text{otherwise} \end{cases} \quad \text{Equation 2}$$

The value of x is always a non-negative integer. The modified Gamma distribution fits the feature message counts better because these counts exhibit a heavy tail with an additional large concentration of 0 counts.

The model building engine 130 is operable to receive the input metrics from the metrics transducer module 120 and the monitored values for the predefined system health indicators from the system 110 (directly from the system 110 or through the metrics transducer module 120). It then derives or generates classifier models that correlate the input metrics as transduced from the event logs to the monitored system health indicators, as described in the Publication PAP-011.

Figure 2:
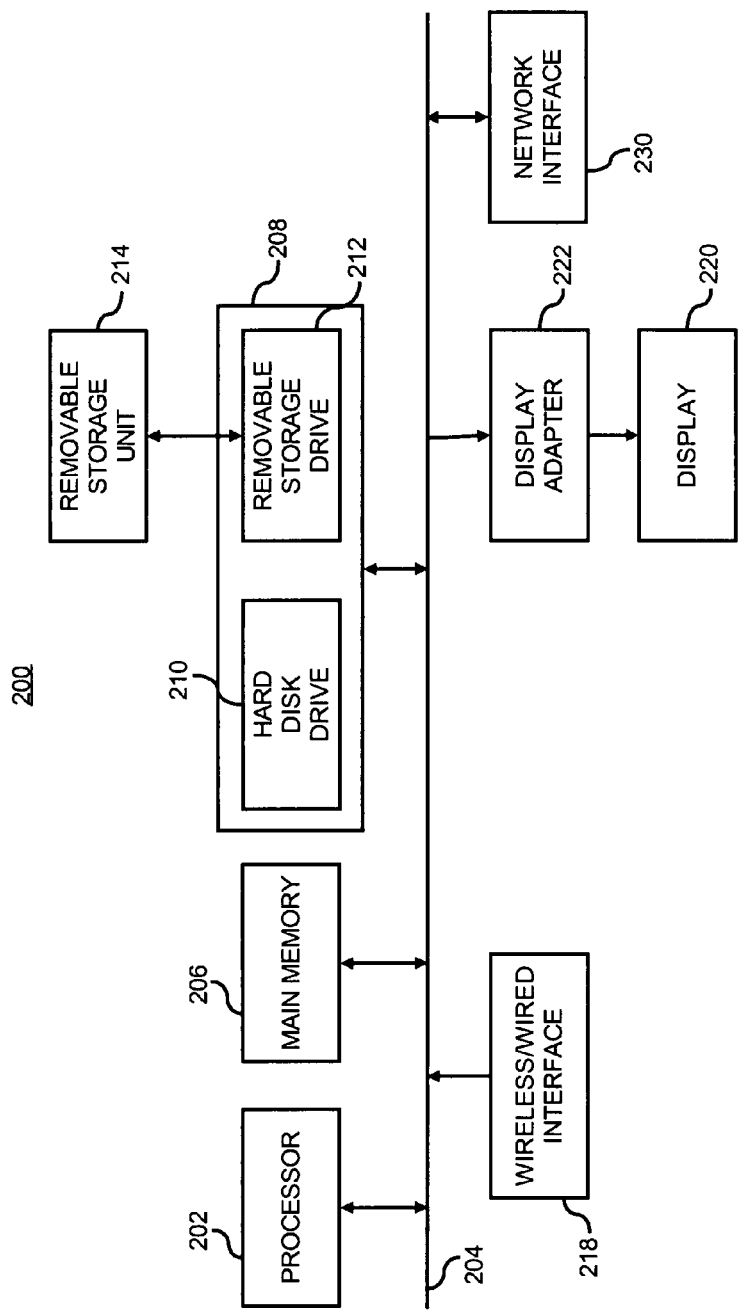
FIG. 2 illustrates a block diagram of a computerized system wherein one or more system components of a distributed environment may be practiced, in accordance with one embodiment.

FIG. 2 illustrates a block diagram of a computerized system 200 that is operable to be used as a platform for implementing the IT system 110, the metrics transducer module 120, or the model building engine 130. Alternatively, the computerized system 200 is operable as a platform for implementing the entire environment 100 or any combination of the components 110-130 therein.

The computer system 200 includes one or more processors, such as processor 202, providing an execution platform for executing software. Thus, the computerized system 200 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 202 are communicated over a communication bus 204 or through point-to-point links with other components in the computer system 200.

The computer system 200 also includes a main memory 206 where software is resident during runtime, and a secondary memory 208. The secondary memory 208 may also be a computer-readable medium (CRM) that may be used to store software programs, applications, or modules that implement the method 300 (as described later), or parts thereof. The main memory 206 and secondary memory 208 (and an optional removable storage unit 214) each includes, for example, a hard disk drive and/or a removable storage drive 212 representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The computer system 200 includes a display 220 connected via a display adapter 222, user interfaces comprising one or more input devices 218, such as a keyboard, a mouse, a stylus, and the like. However, the input devices 218 and the display 220 are optional. A network interface 230 is provided for communicating with other computer systems via, for example, a network.

Process

Figure 3:
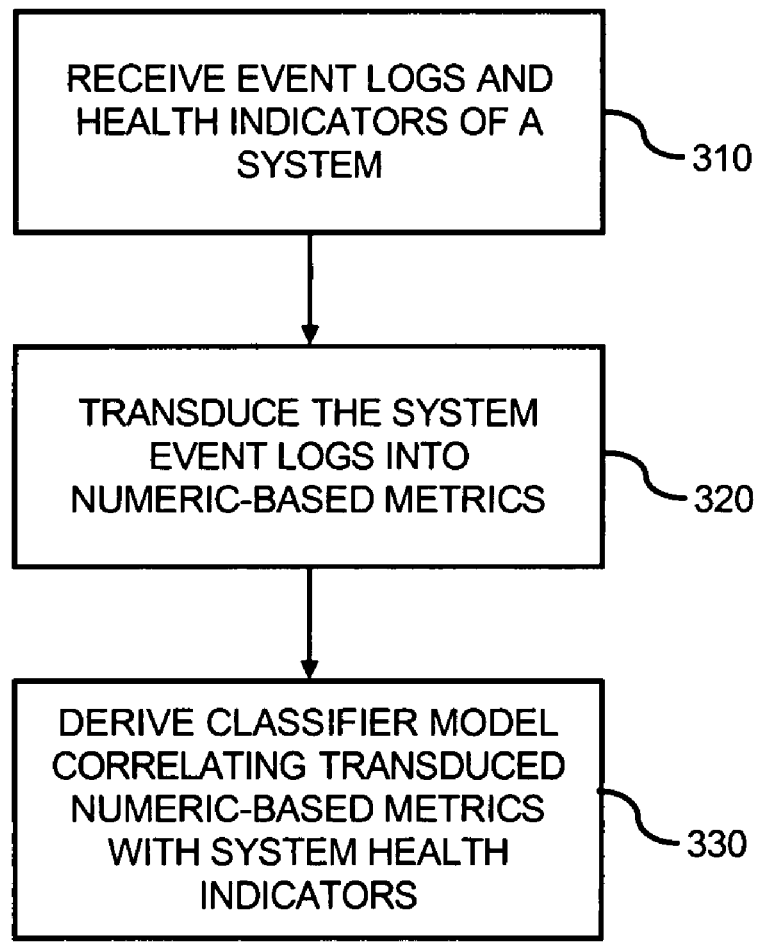
FIG. 3 illustrates a method for providing an efficient representation of event logs of an system and applications therein that is amenable to modeling techniques that produce diagnosis or forecasting of the system health, in accordance with one embodiment

FIG. 3 illustrates a flowchart diagram of a method 300 for providing an efficient representation of event logs of an IT system and applications therein that is amenable to modeling techniques that produce diagnosis or forecasting of the system health, in accordance with one embodiment. For illustrative purposes only and not to be limiting thereof, the method 300 is discussed in the context of the system environment 100 illustrated in FIG. 1. Also for simplification purposes, the method 300 is discussed wherein system health indicators are represented by SLO binary states of compliance and violation. However, it should be understood that the method 300 is modifiable to accommodate other types of system health indicators and different number of health states without deviating from the scope of the present disclosure.

At 310, the text event logs are generated and values of predefined system health indicators, e.g., SLO states (compliance or violation), of the system 110 are monitored by the system 110, using any commercially available data collection tools, such as OpenView software available from Hewlett Packard® Company and Microsoft NT 4.0 Performance Counters available from Microsoft®. In one embodiment, for each predefined time period, window, or epoch (e.g., 5-minute intervals), there is one or more generated event logs, with a plurality of event messages therein, and a corresponding SLO state $S \epsilon \{s^+, s^-\}$ of the system 110. The generated event logs and monitored SLO states are received or obtained by the metrics transducer module 120.

At 320, the transducer module 120 transduces the event logs into numeric-based metrics by distilling a PM set from the event logs. It then counts the number of times each prototypical feature message appears in a given time interval and use these counts as the input metrics for the learning probability classifier models.

At 330, the model building engine 130 receives the transduced numeric-based metrics from the metrics transducer module 120 and the monitored values for the predefined system health indicators from the system 110 (directly from the system 110 or through the metrics transducer module 120). It then computes or derives classifier models that correlate the numeric-based metrics, and thus the generated event logs, to the monitored system health indicators. In one embodiment, the model building engine 130 builds a classifier model, as a Naïve Bayes model based on the transduced numeric-based metrics and a corresponding system health indicator state for each predefined time period, as described in the Publication PAP-011.

Figure 4A:
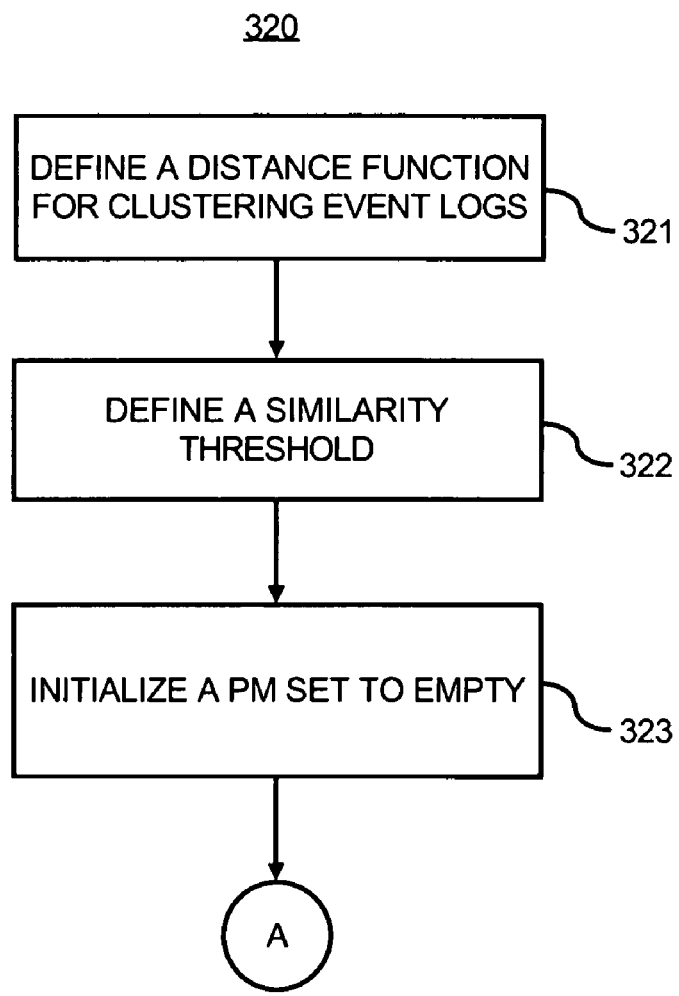
FIGS. 4A-B illustrate further details of a portion of the method illustrated in FIG. 3, in accordance with one embodiment.
Figure 4B:
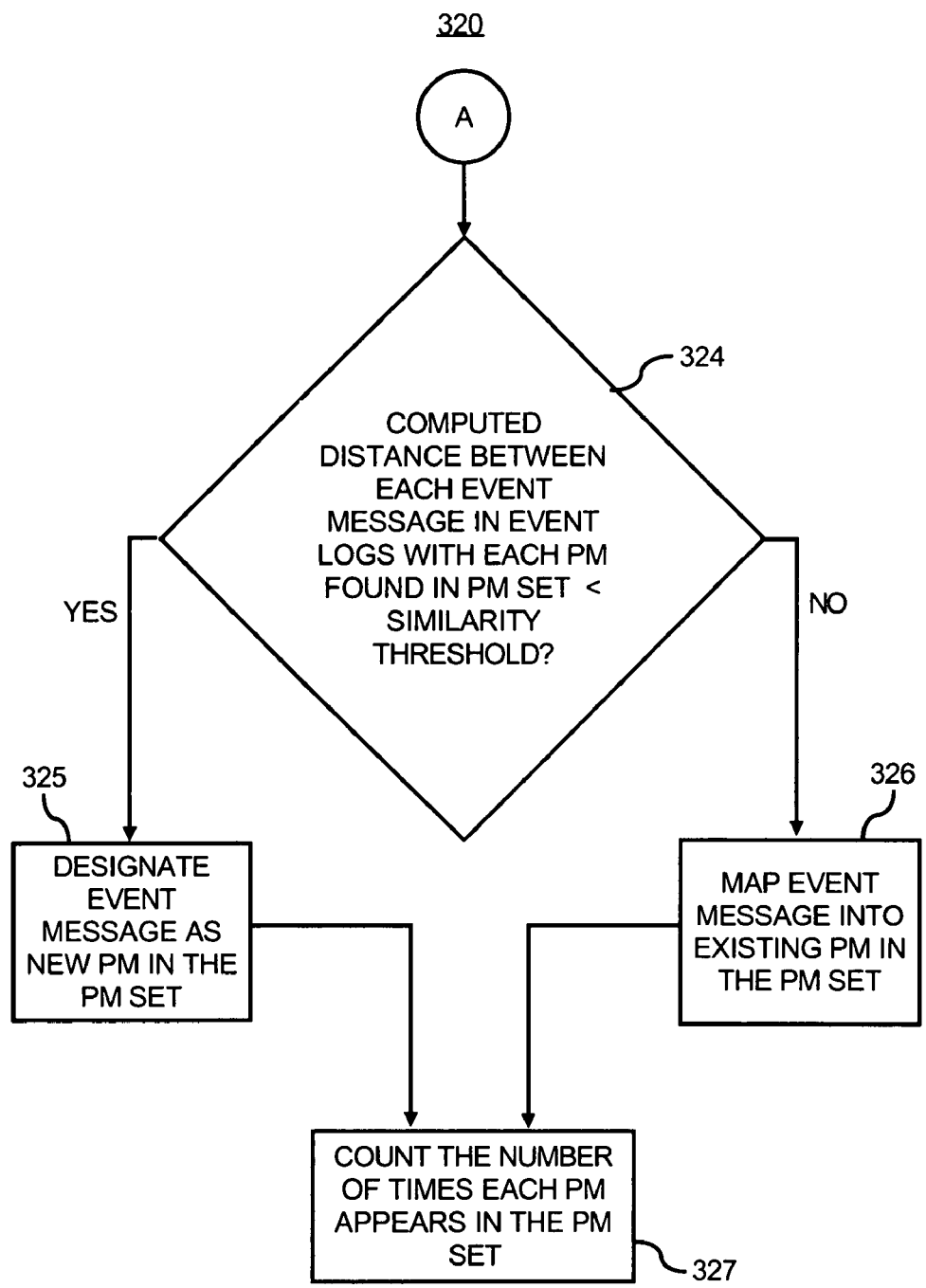

FIGS. 4A-B illustrate a flowchart diagram to provide further details of 320 in FIG. 3 above for transducing the event logs into numeric-based metrics, in accordance with one embodiment.

At 321, a distance function for sequentially clustering the event logs into a PM set is set or provided in the metrics transducer module 120. This distance function may be defined as desired by a user of the environment 100 or any component therein. An example of the distance function is as described earlier in Equation 1.

At 322, a threshold for identifying a similarity between event messages based on the distance function is set or provided in the metrics transducer module 120. As with the distance function, the similarity threshold may be defined as desired by a user. For example, if the cosine distance function as described in Equation 1 is employed, the similarity threshold may be a value near the maximum value of 1 (which indicates the two compared messages are identical). Thus, whenever the calculated distance between two messages is equal to or greater than such a threshold value, the two messages are deemed similar for clustering.

At 323, the PM set is initialized to empty.

At 324, for each predefined time window or period (e.g., each 5-minute interval), the metrics transducer module 120 employs the predefined distance function to compute, in order, a distance between each of the event messages found in the event logs received for such a predefined time window and a prototypical feature message found in the PM set.

At 325, if the computed distance between an event message and all prototypical feature messages is smaller than (or either equal to or smaller than) the predefined similarity threshold, the metrics transducer module 120 designates such an event message as a prototypical feature message in the PM set, i.e., a new member in the PM set, for comparison with other event messages. It should be noted that the first event message is automatically designated as a prototypical feature message because there is initially no other prototypical feature message for the first event message to compare. Accordingly, the PM set is dynamically created for each predefined time window.

At 326, if the computed distance between an event message and a prototypical feature message is greater than or equal to (or just greater than) the predefined similarity threshold, the metrics transducer module 120 maps such an event message to the particular prototypical feature message and increment by one a count of the particular prototypical feature message.

At 327, the metrics transducer module 120 aggregates or counts the number of times each prototypical feature message appears in each predefined period and use these counts as the input metrics for the learning probability classifier models.

Accordingly, for each predefined time window, the metrics transducer module 120 generates a pair of a vector $\vec{M}$ of values of the transduced numeric-based metrics and a corresponding SLO state $S \epsilon \{s^+, s^-\}$ (compliance or violation, respectively) of the system 110. Each element $m_i$ of the vector $\vec{M}$ contains a value indicating the total number of a particular prototypical feature message that is found in the received event logs for each predefined time window. Thus, for multiple predefined time windows, there are multiple pairs of <$\vec{M}$,S>. These pairs are input to the model building engine 130 to create a model for each SLO state relating each state to different values and patterns of metrics that are collected and received by the metrics transducer module 120 from the measured system 110.

In recap, the systems and methods as described herein are operable to provide compact representations of raw textual data in system event logs and transform such representations into numeric-based metrics for system modeling techniques that can produce diagnosis or forecasting of the system health.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for diagnosing system health with system event logs, the method comprising:
    receiving a plurality of text event logs and health indicator states from a system;
    transducing the plurality of text event logs into numeric-based metrics of the system, wherein transducing includes organizing textual event messages of the plurality of text event logs into clusters based on a similarity between the textual event messages and based on whether the similarity is greater than a similarity threshold; and
    deriving, based on the transduced numeric-based metrics, at least one model of the system that correlates the plurality of event logs to the corresponding health indicator states.

2. The method of claim 1, wherein
    transducing comprises: transducing the textual event messages in the plurality of text event logs into the numeric-based metrics indicating one or more conditions of the system or at least one application executing therein.

3. The method of claim 1, wherein
    transducing comprises:
        computing one of the numeric-based metrics for each of the clusters based on the organized clusters.

4. The method of claim 3, wherein the step of organizing comprises:
    providing a distance function for clustering the plurality of text event logs;
    providing the similarity threshold;
    providing a cluster set;
    computing a distance between each of the textual event messages and each cluster found in the cluster set, based on the provided distance function;
    comparing the computed distance with the provided similarity threshold;
    responsive the computed distances being smaller than the provided similarity threshold, adding the textual event message associated with the computed distance as a new cluster in the cluster set.

5. The method of claim 4, wherein the step of organizing further comprises:
    responsive the computed distance being greater than or equal to the provided similarity threshold, adding a count to the cluster associated with the computed distance.

6. The method of claim 5, wherein the step of computing comprises:
    computing a value for each one of the numeric-based metrics for each cluster found in the cluster set by aggregating a number of counts in the each cluster.

7. The method of claim 6, wherein the step of deriving comprises:
    deriving the at least one system model correlating each of the computed numeric-based metrics with one of the health indicator states.

8. The method of claim 4, wherein the step of providing the cluster set comprises:
    initializing the cluster set as an empty set.

9. The method of claim 1, wherein the step of receiving comprises:
    receiving the plurality of text event logs and health indicator states over a plurality predefined time periods, wherein there is at least one of the plurality of text event logs and one of the health indicator states corresponding to each of the plurality of predefined time periods.

10. The method of claim 4, wherein the distance function is a cosine distance function for determining a similarity between two textual event messages.

11. The method of claim 1, wherein the step of transducing comprises:
    distilling, from the organizing of textual event messages, a set of prototypical event messages from the plurality of text event logs;
    counting a number of times each of prototypical event messages appears in a predefined time period; and
    setting the count for each of the prototypical event messages as one of the transduced numeric-based metrics.

12. A system for providing automated health diagnosis of a computing system, comprising:
    a metrics transducer module operates to receive a plurality of text event logs and health indicator states of the computing system and to transduce the plurality of text event logs into numeric-based metrics of the system, wherein the metrics transducer module organizes textual event messages of the plurality of text event logs into clusters based on a similarity between the textual event messages and based on whether the similarity is greater than a similarity threshold; and a model building engine, executed by a processor, operates to derive, based on the transduced numeric-based metrics, at least one model of the system that correlates the plurality of text event logs to the corresponding health indicator states.

13. The system of claim 12, wherein:
    each of the transduced numeric-based metrics includes an identification of the each transduced numeric-based metric and a numerical value for the each transduced numeric-based metric.

14. The system of claim 13, wherein the numerical value for one of the transduced numeric-based metrics indicates a number of the plurality of textual event messages that is categorized into a defined group of messages.

15. The system of claim 14, wherein the metrics transducer module includes a distance function that operates to categorize the number of the plurality of textual event messages into the defined group of messages.

16. The system of claim 15, wherein the distance function is a cosine distance function for determining a similarity between two text messages.

17. The system of claim 12, wherein the metrics transducer module further computes a distance between each of the textual event messages and each of the clusters based on a distance function, compares the computed distance with the similarity threshold, and, if the computed distance is smaller than the similarity threshold, adds the textual event message associated with the computed distance as a new cluster into the clusters.

18. The system of claim 17, wherein the clusters are dynamically defined by the textual event messages in the plurality of text event logs.

19. A computer readable non-transitory medium on which is encoded computer executable programming code that includes computer execution instructions to: receive a plurality of text event logs and health indicator states from a system; transduce the plurality of text event logs into numeric-based metrics of the system including organize textual event messages of the plurality of text event logs into clusters based on a similarity between the textual event messages and based on whether the similarity is greater than a similarity threshold; and derive, based on the transduced numeric-based metrics, at least one model of the system that correlates the plurality of text event logs to the corresponding health indicator states.

20. The computer-readable non-transitory medium of claim 19, wherein the numeric-based metrics indicating indicate one or more conditions of the system or at least one application executing therein.

* * * * *

UNITED STATES PATENT AND TRADEMARK OFFICE
CERTIFICATE OF CORRECTION

| | | |
|---|---|---|
| PATENT NO. | : 8,095,830 B1 | Page 1 of 1 |
| APPLICATION NO. | : 11/732454 | |
| DATED | : January 10, 2012 | |
| INVENTOR(S) | : Ira Cohen et al. | |

It is certified that error appears in the above-identified patent and that said Letters Patent is hereby corrected as shown below:

In column 10, lines 12-13, in Claim 20, delete "indicating indicate" and insert -- indicate --, therefor.

Signed and Sealed this
Fourth Day of December, 2012

David J. Kappos
*Director of the United States Patent and Trademark Office*